(12) United States Patent
Gale et al.

(10) Patent No.: US 8,401,722 B2
(45) Date of Patent: Mar. 19, 2013

(54) SYSTEM AND METHOD FOR CHARGING A VEHICLE BATTERY

(75) Inventors: Allan Roy Gale, Livonia, MI (US); Paul Theodore Momcilovich, Tecumseh, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 12/976,154

(22) Filed: Dec. 22, 2010

(65) Prior Publication Data

US 2012/0166026 A1    Jun. 28, 2012

(51) Int. Cl.
*B60L 9/00* (2006.01)

(52) U.S. Cl. ............ 701/22; 701/1; 701/2; 320/104; 320/109

(58) Field of Classification Search .................. None
See application file for complete search history.

(56) References Cited

U.S. PATENT DOCUMENTS

| | | | | |
|---|---|---|---|---|
| 5,736,831 | A * | 4/1998 | Harrington | 320/104 |
| 5,892,346 | A * | 4/1999 | Moroto et al. | 318/587 |
| 7,256,516 | B2 * | 8/2007 | Buchanan et al. | 307/62 |
| 7,778,746 | B2 * | 8/2010 | McLeod et al. | 701/22 |
| 2008/0218121 | A1 * | 9/2008 | Gale et al. | 320/109 |
| 2009/0091291 | A1 * | 4/2009 | Woody et al. | 320/109 |
| 2010/0082277 | A1 * | 4/2010 | Ballard | 702/63 |
| 2010/0292855 | A1 * | 11/2010 | Kintner-Meyer | 700/291 |
| 2011/0148353 | A1 * | 6/2011 | King et al. | 320/109 |
| 2011/0172862 | A1 * | 7/2011 | Ortmann et al. | 701/22 |
| 2011/0202217 | A1 * | 8/2011 | Kempton | 701/22 |
| 2011/0202418 | A1 * | 8/2011 | Kempton et al. | 705/26.1 |

FOREIGN PATENT DOCUMENTS

| | | |
|---|---|---|
| WO | 2007149289 A1 | 12/2007 |
| WO | 2009014543 A1 | 1/2009 |
| WO | 2009059164 A2 | 5/2009 |
| WO | 2009104634 A1 | 8/2009 |

OTHER PUBLICATIONS

Dynamic Power Sharing Strategy for Active Hybrid Energy Storage Systems; Zhang et al. 5th IEEE Vehicle Power and Propulsion Conference; 2009.

* cited by examiner

*Primary Examiner* — Khoi Tran
*Assistant Examiner* — Jonathan L Sample
(74) *Attorney, Agent, or Firm* — David B. Kelley; Brooks Kushman P.C.

(57) ABSTRACT

An automotive vehicle may include at least one controller and a battery charger that receives electrical energy from a power distribution circuit remote from the vehicle. The at least one controller may request that a battery charger of another vehicle draw a specified current, and may establish a battery charging schedule with the another vehicle for the battery charger if, after issuing the request, the at least one controller detects a drop in voltage on the power distribution circuit.

14 Claims, 2 Drawing Sheets

SYSTEM AND METHOD FOR CHARGING A VEHICLE BATTERY

BACKGROUND

A plug-in hybrid electric or battery electric vehicle may include an on-board battery charger. This battery charger may be plugged into a standard wall outlet to electrically connect the battery charger with a power distribution circuit.

A residential power distribution circuit typically has limits with regard to the power and/or current it can supply. If these limits are exceeded, fuses associated with the power distribution circuit may blow.

SUMMARY

A method of charging a battery of a vehicle may include issuing a request to establish communications with another vehicle, instructing the another vehicle to draw a specified current from a power distribution circuit, monitoring a voltage associated with a power distribution circuit, and establishing a battery charging schedule with the another vehicle if the voltage decreases.

DETAILED DESCRIPTION

Several alternatively powered vehicles, such as plug-in hybrid electric vehicles and/or battery electric vehicles, may be parked in a single garage. This garage may provide electrical outlets for the vehicles to be plugged into. Situations may arise where the vehicles attempt to charge their respective batteries at the same time. This may cause the power and/or current limits associated with the power distribution circuit servicing the garage to be exceeded. As a result, attempts to charge the batteries may be hampered.

Figure 1:
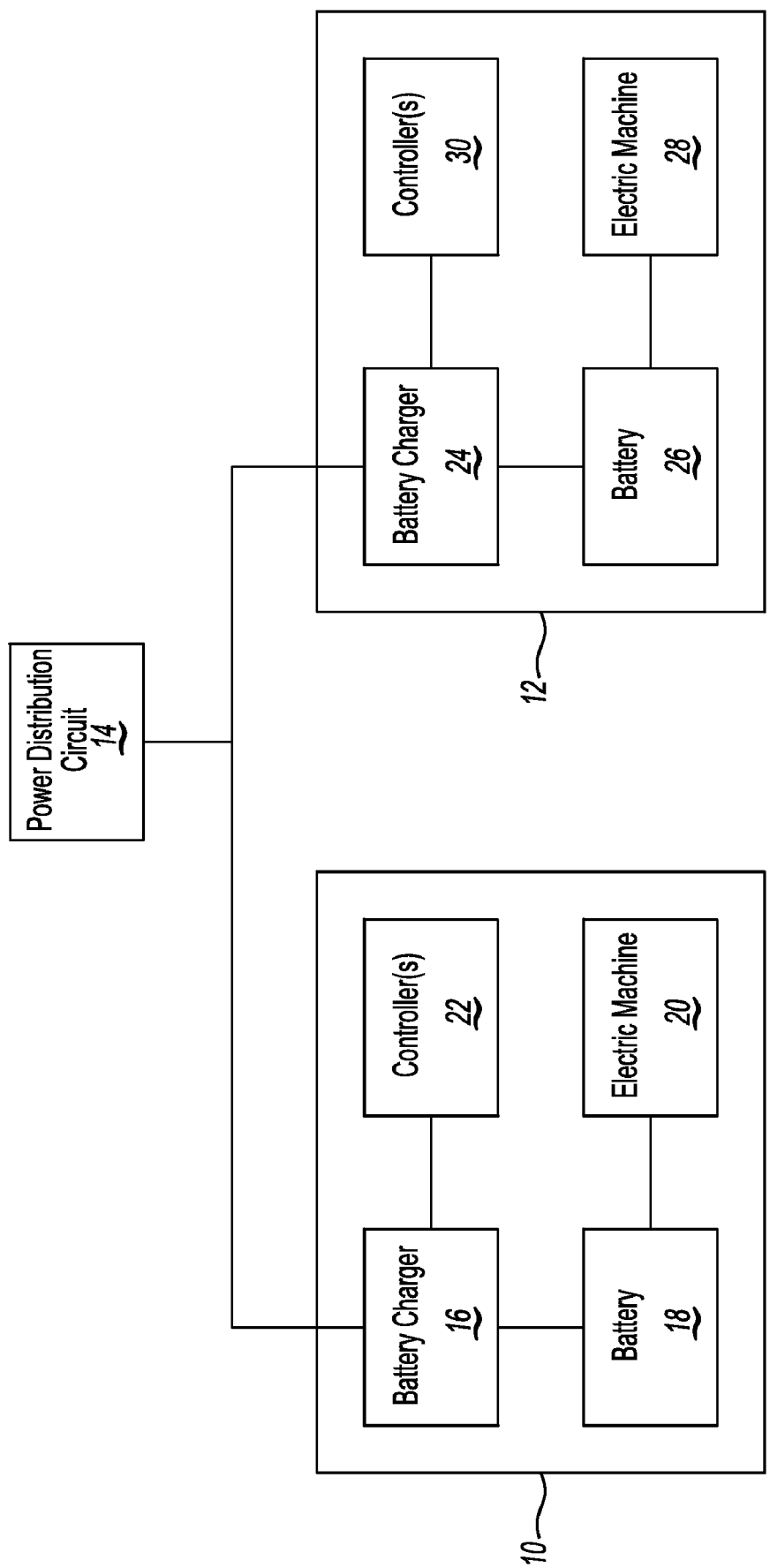
FIG. 1 is a block diagram of two alternatively powered vehicles and a power distribution circuit.

Referring to FIG. 1, alternatively powered vehicles 10, 12 are electrically connected with a power distribution circuit 14 (e.g., a residential power distribution circuit) via a wall outlet (not shown). The vehicle 10 includes a battery charger 16, battery 18, electric machine 20, and one or more controllers 22. Likewise, the vehicle 12 includes a battery charger 24, battery 26, electric machine 28, and one or more controllers 30. Other configurations, however, are also possible.

The battery charger 16 is configured to be electrically connected with the power distribution circuit 14. For example, a power cord electrically connected with the battery charger 16 may be plugged into the wall outlet (not shown) associated with the power distribution circuit 14. Hence, energy may flow from the power distribution circuit 14 to the battery charger 16. The battery charger 16 may then provide energy to charge the battery 18.

The electric machine 20 is configured to transform electrical energy from the battery 18 to mechanical energy to move the vehicle 10 as known in the art. The electric machine 20 may also transform mechanical energy to electrical energy for storage by the battery 18 as known in the art.

The one or more controllers 22 may include known/suitable wired (e.g., power line communication) or wireless (e.g., Wi-Fi) technologies to facilitate communications with other such vehicles and/or the power distribution circuit 14. In the case of wired technology for example, power line communication modules may be present within the one or more controllers 22. Hence, any electrical connection between the power distribution circuit 14 and battery charger 16 may also serve as the signal carrying medium for communications. In the case of wireless technology for example, wireless transceivers may be present within the one or more controllers 22, etc.

The one or more controllers 22, as explained in more detail below, are in communication with/control the battery charger 16 in order to determine, inter alia, whether another vehicle, such as the vehicle 12, is electrically connected with the power distribution circuit 14.

The battery charger 24, battery 26, electric machine 28, and one or more controllers 30 are arranged and may operate in a manner similar to that described with respect to the battery charger 16, battery 18, electric machine 20, and one or more controllers 22.

Figure 2:
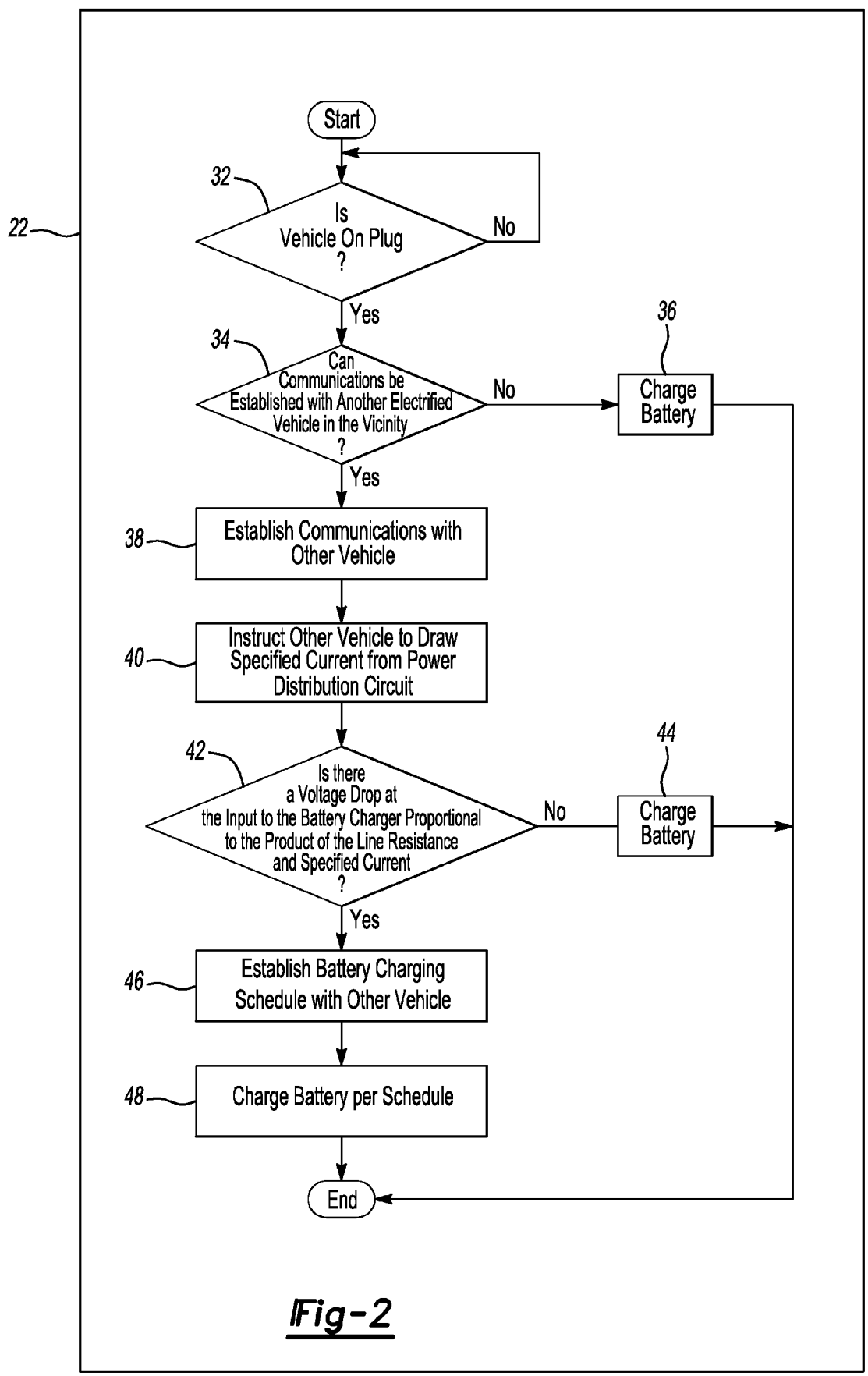
FIG. 2 is a flow chart illustrating an algorithm for determining whether another vehicle is electrically connected with the power distribution circuit of FIG. 1.

Referring to FIGS. 1 and 2, it is determined whether the vehicle is on plug at operation 32. The one or more controllers 22, for example, may determine in any known/suitable fashion whether the battery charger 16 is electrically connected with the power distribution circuit 14. If no, the algorithm returns to operation 32. If yes, it is determined whether communications can be established with another electrified vehicle in the vicinity at operation 34. For example, the one or more controllers 22 may broadcast a request to establish a communication link (via wired or wireless technology as the case may be) with any other vehicle that receives the request. If no, the battery is charged at operation 36. The one or more controllers 22, for example, may enable the battery charger 16 to receive power from the power distribution circuit 14 and to provide power to charge the battery 18 to some desired voltage. The algorithm then ends.

If yes, communications are established with the other vehicle at operation 38. The one or more controllers 22, for example, may receive a response to the request from the vehicle 14. As a result, the one or more controllers 22 using known/suitable communications protocols may establish a communication link with the one or more controllers 30. At operation 40, the other vehicle may be instructed to draw a specified current from the power distribution circuit. The one or more controllers 22, for example, may instruct the one or more controllers 30 to cause 5A of current to be drawn from the power distribution circuit 14 beginning at a certain time and lasting for a period of four minutes. At operation 42, it is determined whether there is a voltage drop at the input to the battery charger proportional to the product of the line resistance of the power distribution circuit and the specified current. For example, the one or more controllers 22 may detect, measure, etc. the voltage at the input to the battery charger 16 before and after the begin time for the current drawn by the vehicle 12. If there is a change in voltage proportional to the product of the line resistance of the power distribution circuit 14 and, in this example, 5A, the one or more controllers 22 may conclude that the battery charger 24 is electrically connected with the power distribution circuit 14. To determine the line resistance of the power distribution circuit 14, the one or more controllers 22 may detect, measure, etc. the change in voltage at the input to the battery charger 16 before and after the battery charger 16 is enabled to draw a specified current from the power distribution circuit 14. Dividing the change in voltage by the specified current will yield an approximation of the line resistance of the power distribution circuit 14. If no, the battery is charged at operation 44. The algorithm then ends.

If yes, a battery charging schedule may be established with the other vehicle at operation 46 so that both vehicles are not attempting to charge their batteries at the same time, or so that both vehicles collectively charge at or less than the rating of the power distribution circuit, etc. For example, the one or more controllers 22 may arrange with the one or more controllers 30 a charging schedule whereby only one of the vehicles 10, 12 is drawing power from the power distribution circuit 14 at any given time (e.g., the battery chargers 16, 24 may alternately draw power at 10 minute time intervals, etc.) At operation 48, the battery is charged according to the schedule. The algorithm then ends.

In other embodiments, it may be determined whether there is a voltage drop at the input to the battery charger at operation 42. That is, the one or more controllers 22, for example, may simply monitor the input to the battery charger 16 for voltage drops that coincide with the begin time for the specified current draw of the other vehicle.

In still other embodiments, the one or more controllers 22 may seek to establish a charging schedule with any other vehicle it establishes communications with. That is, the one or more controllers 22 need not perform operations 40, 42. Rather, the one or more controllers 22 may assume that any vehicle it is in communication with is electrically connected to the same power distribution circuit. As an example, if the one or more controllers 22 establish a communication link with another vehicle, the one or more controllers 22 may then establish a charging schedule with that vehicle.

The algorithms disclosed herein may be deliverable to/implemented by a processing device, such as the battery charger 16 or one or more controllers 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive vehicle comprising:
a battery charger configured to receive electrical energy from a power distribution circuit remote from the vehicle; and
at least one controller configured to request that a battery charger of another vehicle draw a specified current and to establish a battery charging schedule with the another vehicle for the battery charger if, after issuing the request, the at least one controller detects a drop in voltage proportional to the product of a line resistance of the power distribution circuit and the specified current.

2. The vehicle of claim 1 wherein the at least one controller is further configured to determine the line resistance of the power distribution circuit.

3. The vehicle of claim 2 wherein determining the line resistance of the power distribution circuit includes causing a current to be drawn from the power distribution circuit and determining the voltage on the power distribution circuit before and after the current is drawn from the power distribution circuit.

4. The vehicle of claim 1 wherein the at least one controller is further configured to request that the battery charger of the another vehicle draw the specified current for a specified time period and wherein the battery charging schedule is established if the drop in voltage occurs during the specified time period.

5. The vehicle of claim 1 wherein the at least one controller is further configured to initiate communications with the another vehicle.

6. A method of charging a battery of a vehicle comprising:
by at least one controller,
issuing a request to establish communications with another vehicle,
instructing the another vehicle to draw a specified current from a power distribution circuit,
monitoring a voltage associated with the circuit, and
establishing a battery charging schedule with the another vehicle if the voltage decreases proportional to the product of a line resistance of the circuit and the specified current.

7. The method of claim 6 further comprising determining the line resistance of the power distribution circuit.

8. The method of claim 7 wherein determining the line resistance of the power distribution circuit includes drawing a current from the power distribution circuit and determining the voltage on the power distribution circuit before and after the current is drawn from the power distribution circuit.

9. The method of claim 6 further comprising instructing the another vehicle to draw the specified current from the power distribution circuit for a specified time period and wherein the battery charging schedule is established if the voltage decreases during the specified time period.

10. A vehicle comprising:
a battery charger configured to receive electrical energy from a power distribution circuit remote from the vehicle; and
at least one controller configured to determine whether communications can be established with another vehicle, to request that a battery charger of the another vehicle draw a specified current if communications can be established with the another vehicle, and to establish a battery charging schedule with the another vehicle for the battery charger if, after issuing the request, the at least one controller detects a drop in voltage on the power distribution circuit.

11. The vehicle of claim 10 wherein the battery charging schedule is established if the drop in voltage is proportional to the product of a line resistance of the power distribution circuit and the specified current.

12. The vehicle of claim 11 wherein the at least one controller is further configured to determine the line resistance of the power distribution circuit.

13. The vehicle of claim 12 wherein determining the line resistance of the power distribution circuit includes causing a current to be drawn from the power distribution circuit and determining the voltage on the power distribution circuit before and after the current is drawn from the power distribution circuit.

14. The vehicle of claim 10 wherein the at least one controller is further configured to request that the battery charger of the another vehicle draw the specified current for a specified time period and wherein the battery charging schedule is established if the drop in voltage occurs during the specified time period.

* * * * *